United States Patent
Kondratov et al.

(10) Patent No.: US 11,748,911 B2
(45) Date of Patent: Sep. 5, 2023

(54) SHADER FUNCTION BASED PIXEL COUNT DETERMINATION

(71) Applicant: Trivver, Inc., Huntington Beach, CA (US)

(72) Inventors: Sergey Kondratov, Krasnoyarsk (RU); Igor Bitny, Newport Beach, CA (US); Alexander Arbuznikov, Krasnoyarsk (RU)

(73) Assignee: Trivver, Inc., Merritt Island, FL (US)

( * ) Notice: Subject to any disclaimer, the term of this patent is extended or adjusted under 35 U.S.C. 154(b) by 0 days.

(21) Appl. No.: 17/086,442

(22) Filed: Nov. 1, 2020

(65) Prior Publication Data

US 2021/0049788 A1    Feb. 18, 2021

Related U.S. Application Data

(63) Continuation of application No. 16/262,880, filed on Jan. 30, 2019, now Pat. No. 10,825,200.

(51) Int. Cl.
*G06T 7/90* (2017.01)
*G06T 7/50* (2017.01)
*G06T 19/20* (2011.01)
*G06T 15/00* (2011.01)

(52) U.S. Cl.
CPC ............ *G06T 7/90* (2017.01); *G06T 7/50* (2017.01); *G06T 15/005* (2013.01); *G06T 19/20* (2013.01); *G06T 2207/20024* (2013.01); *G06T 2207/30242* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 2010/0177234 | A1* | 7/2010 | Ogura | G06T 7/194 348/333.03 |
| 2013/0343644 | A1* | 12/2013 | Campbell | H04N 1/40062 382/162 |
| 2018/0197326 | A1* | 7/2018 | Nystad | G06T 15/405 |

(Continued)

OTHER PUBLICATIONS

Hergaarden, Mike; "Graphics shaders;" Vrije Universiteit Amsterdam; De Boelelaan 1105, 1081 HV Amsterdam, Netherlands (2011): 22 pages; http://files.m2h.nl/LiteraturestudyShaders.pdf (Year: 2011).*

(Continued)

*Primary Examiner* — Edward Martello
(74) *Attorney, Agent, or Firm* — CHHABRA LAW FIRM, PC

(57) ABSTRACT

Methods, systems, and techniques are disclosed to determine a pixel count of an object of interest in a multidimensional digital environment, based on the texture of the multidimensional object considered as an object of interest. In one embodiment, a technique to determine a percentage of an object of interest displayed in a viewport is disclosed. The technique includes rendering using a shader function the object of interest with a first color, rendering, using the shader function, the remainder of a scene displayed on the viewport with a second color, and determining a pixel count of pixels rendered with the first color to determine the percentage of an object of interest displayed on the viewport.

20 Claims, 5 Drawing Sheets

(56) References Cited

U.S. PATENT DOCUMENTS

2021/0205704 A1 7/2021 Badichi
2022/0118359 A1 4/2022 Badichi

OTHER PUBLICATIONS

Anonymous: "How to calculate screen area coverage of a 3D object", Unity Community, 21 Apr. 1, 2014 (Apr. 21, 2014), pp. 1-2, XP055705084, Retrieved from the Internet:URL:https://answers.unity.com/questions/691066/how-to-calculate-screen-area-coverage-of-a-3d-obje.html.

Anonymous: "Ansys Fluent 12.0 User's Guide—30.5 Projected Surface Area Calculations" Jan. 29, 2009 (Jan. 29, 2009). XP055705653. Retrieved from the Internet: URL:https://www.afs.enea.it/project/neptunius/docs/fluent/html/ug/node963.htm#tsec-project-surf.

James D. Foley et al: "Computer Graphics Principles and Practice" In: "Computer Graphics Principles and Practice". Jan. 1, 1987 (Jan. 1, 1987). Addison-Wesley. Reading. MA. USA. XP055731305. pp. 668-673. section 15.4.

Naga K Govindaraju et al: "Fast computation of database operations using graphics processors". Jul. 31, 2005; 1077952576-1077952576. Jul. 31, 2005 (Jul. 31, 2005). pp. 206-es. XP058318221. 001: 10.1145/1198555.1198787 sections 3.1. 3.24.1. 4.3.1.

Anonymous: "Style buildings-ArcGIS Online Help: ArcGIS" Oct. 7, 2017 (Oct. 7, 2017). XP055729753. Retrieved from the Internet: URL:https://web.archive.org/web/20171007003301/https://doc.arcgis.com/en/arcgis-online/create-maps/scene-style-buildings.htm.

Inigo Quilez: "Sphere projection".Inigo Quilez: fractals, computer graphics, mathematics. shaders. demoscene and more. Jan. 1, 2014 (Jan. 1, 2014). XP055729674. Retrieved from the Internet: URL:https://iquilezles.org/www/articles/sphereproj/sphereproj.htm.

Mike Hergaarden: "Graphics shaders",Jan. 1, 2011 (Jan. 1, 2011), XP055731357, Retrieved from the Internet: URL:https://www.cs.vu.nl/-eliens/download/literatuur-shaders.pdf.

Marroquim R et al: "Introduction to GPU Programming with GLSL", Computer Graphics and Image Processing (SIBGRAPI Tutorials), 2009 Tutorials of the XXII Brazilian Symposium on, IEEE, Piscataway, NJ, USA, Oct. 11, 2009 (Oct. 11, 2009), pp. 3-16, XP031616868, ISBN : 978-1-4244-4979-8 abstract p. 9, left-hand column, paragraph 2-6 figure 19.

Shawn Hargreaves: "Combining shaders", Aug. 17, 2009 (Aug. 17, 2009), XP055729750, Retrieved from the Internet: URL:http://www.shawnhargreaves.com/blog/combining-shaders.html.

Dieter Schmalstieg et al: "Real-t ime Bounding Box Area Computation", Jun. 1, 1999 (Jun. 1, 1999), XP055729701, Retrieved from the Internet: URL:https://www.cg.tuwien.ac.at/research/publications/1999/Fuhr-1999-Conc/TR-186-2-99-05Paper.pdf.

Watt A: "3D Computer Graphics, passage", 3D Computer Graphics, XX, XX, Jan. 1, 2000 (Jan. 1, 2000), pp. 123-135, 142, XP002352223, p. 147, paragraph 1.

Anonymous: "8 .4—Viewports—LearnWebGL", Mar. 8, 2016 (Mar. 8, 2016), XP055729723, Retrieved from the Internet: URL:http://learnwebgl.brown37.net/08 projections/projections viewport.html.

\* cited by examiner

400

---

A first pass in a rendering pipeline, by a graphics processor, wherein the first pass renders a multidimensional object to determine a first depth information of each pixel of the multidimensional object within a scene in the multidimensional environment, and wherein the multidimensional object is determined to be the object of interest

402

---

A second pass in the rendering pipeline, wherein the second pass includes rendering the scene, and wherein the multidimensional object is rendered in a first predetermined color, and wherein the second pass includes determining a second depth information of each pixel within the scene

404

---

Compare the first depth information and second depth information for each respective pixel within the scene

406

---

Change the color of each respective pixel in the scene to a second predetermined color when its corresponding first depth information and second depth information are different

408

---

Determine a total number of pixels having the first predetermined color.

SHADER FUNCTION BASED PIXEL COUNT DETERMINATION

CROSS REFERENCE TO RELATED APPLICATIONS

The present application is a continuation of, and claims priority from, co-pending U.S. patent application Ser. No. 16/262,880, titled "TEXTURE BASED PIXEL COUNT DETERMINATION" filed on Jan. 30, 2019. The contents of the above identified application is incorporated herein by reference for all purposes to the extent that such subject matter is not inconsistent herewith.

FIELD OF THE INVENTION

Embodiments of the present invention relates generally to determining a pixel count of a virtual object. More particularly, embodiments of the invention relate to determining a pixel count of a virtual object of interest in a computer generated multidimensional environment using the texture of the virtual object of interest.

BACKGROUND OF THE INVENTION

Multi-dimensional computer generated or simulated environments are utilized in many different fields that use computer aided visualization techniques. Pixel count determination of a multidimensional object can be used to determine the size of the object being displayed comparative to the viewport space can be used for data collection and/or analytics. A texture is generally an image applied to a surface in multidimensional (e.g., three dimensional) environments.

However, currently known embodiments are inefficient or inaccurately determine the pixel count on an object of interest when the object is rendered using a texture. Therefore, what is needed are systems, methods, and techniques that can overcome the above identified limitations and accurately determine a pixel count of a multidimensional digital object of interest within the multidimensional environment.

SUMMARY OF THE DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method comprising performing a first pass in a rendering pipeline, by a graphics processor, where the first pass renders a multidimensional object to determine a first depth information of each pixel of the multidimensional object within a scene of an electronically generated multidimensional digital environment, and where the multidimensional object is determined to be the object of interest. The method also includes performing a second pass in the rendering pipeline, where the second pass includes rendering the entire scene, and where the multidimensional object is rendered in a first predetermined color, and where the second pass includes determining a second depth information of each pixel within the scene. The method also includes comparing the first depth information and second depth information for each respective pixel within the scene. The method also includes changing the color of each respective pixel in the scene to a second predetermined color when its corresponding first depth information and second depth information are different. The method also includes determining a total number of pixels having the first predetermined color to determining a pixel count of the object of interest in a viewport of the electronically generated multidimensional environment. Other embodiments of this aspect include corresponding computer systems, apparatus, and computer programs recorded on one or more computer storage devices, each configured to perform the actions of the methods.

Embodiments may include one or more of the following features. In any embodiment, the scene can include a set of multidimensional objects, where each multidimensional object in the set of multidimensional objects is determined to be the object of interest, and where the first predetermined color is unique for each respective multidimensional object in the set of multidimensional objects, and where the first predetermined color for each respective multidimensional object is selected from a set of colors. Other implementations can include having the first pass applied using a first shader function or program, and where the second pass is applied using a second shader function or program. In other embodiments, comparing the first depth information and the second depth information of each respective pixel within the scene includes applying a post-processing filter to the second pass, where the post-processing filter includes the first depth information. In one embodiment, the first pass results in the scene having a first texture based on the first depth information, where the first depth information is stored in memory associated with the graphics processor.

In one embodiment, the first depth information of each pixel is stored in at least one of a red, green, blue, or alpha component associated with each respective pixel. In another embodiment, the second depth information is determined from the z-buffer of the graphics processor during the second pass. In one embodiment, the depth information can also be determined from the z-buffer of the graphics processor in the first pass. In yet another embodiment, the first pass and the second pass of the rendering pipeline are performed in a low resolution. In one embodiment, the scene light, transparent, or semi-transparent objects are not considered during the rendering pipeline. In one embodiment, the first or second depth information includes information related to a distance of the pixel from a camera rendering the scene. In one embodiment, the rendering is performed in an unlit mode. In yet another embodiment, the second predetermined color is black. In yet another embodiment, the first pass only renders the objects of interest.

In yet another embodiment, a method to determine pixel count can include, implementing, by a graphics processor, a shader program to render an object with a predetermined color when the predetermined color is passed as an input parameter, and where when the input parameter is not provided the shader is configured to render the object in another predetermined color. The method also includes passing the first predetermined color as the input parameter to the shader program during the rendering of a multidimensional object that is to be rendered in a scene in the multidimensional digital environment, the multidimensional object determined as an object of interest. The method also includes not providing the input parameter to the shader program during the rendering of an object that is not considered as the object of interest. The method also includes performing a count of a number of pixels that are rendered with the predetermined color.

Implementations of the described techniques may include hardware, a method or process, or computer software on a computer-accessible medium.

BRIEF DESCRIPTION OF THE DRAWINGS

The present invention is illustrated by way of example and not limitation in the figures of the accompanying drawings in which like references indicate similar elements.

FIG. 4 illustrates flowchart 400 describing the operations to determine a pixel count of a multidimensional object from the texture of the rendered object, according to one embodiment of the present invention.

DETAILED DESCRIPTION

Figure 1:
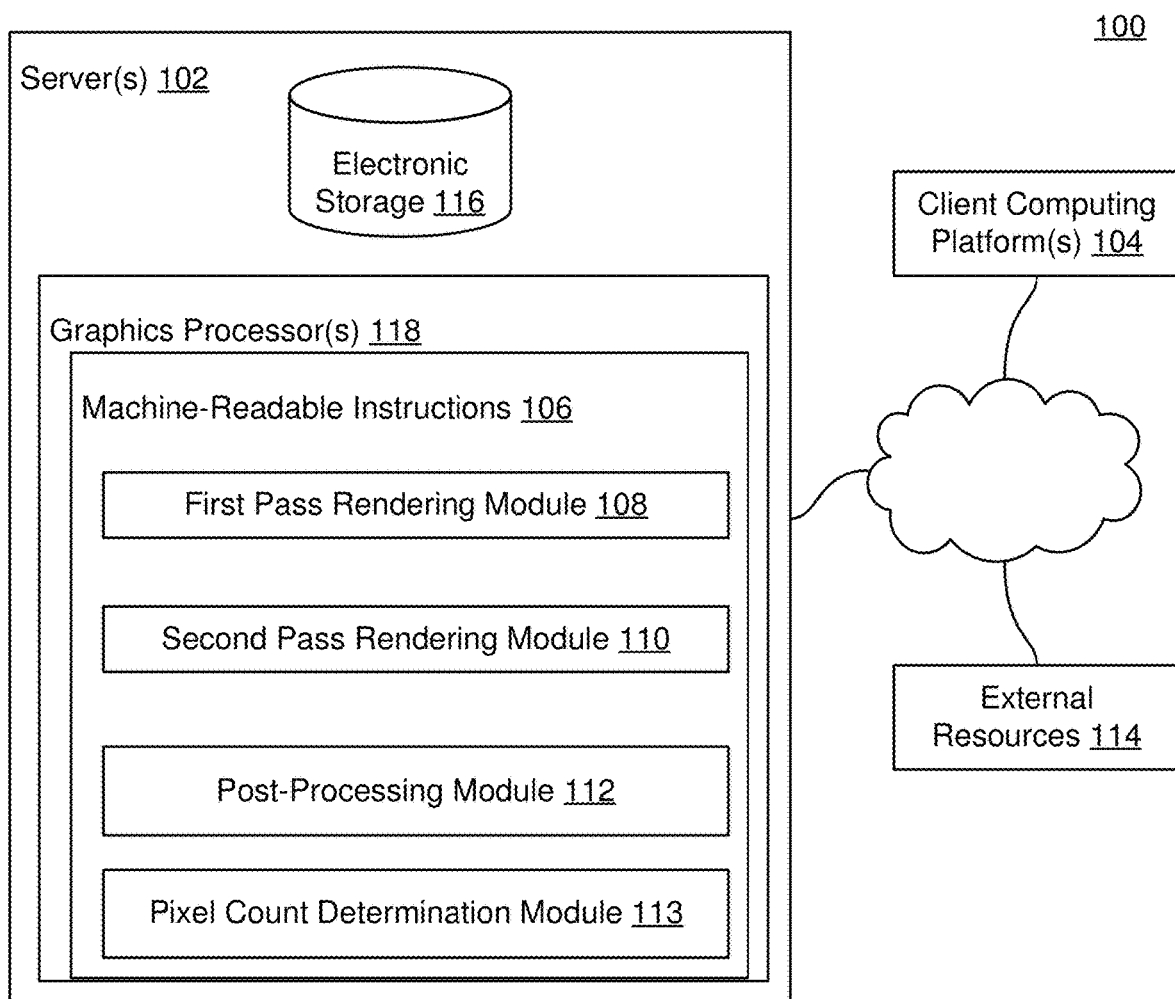
FIG. 1 illustrates system 100 configured to method to determine a pixel count of a multidimensional object in a multidimensional digital environment based on a rendered texture, according to one embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Although exemplary embodiments are explained in a screen coordinate system, the scope of the invention is not intended to be limited to conventional rendering devices (e.g., screens), but can include multidimensional rendering devices, including interfaces required for virtual and augmented reality systems.

In one embodiment, visible texture pixels pertaining to an object of interest in a multidimensional digital environment can be determined. An object of interest can be any multidimensional object within the multidimensional digital environment whose pixel count within a viewport needs to be determined. In one embodiment, a multidimensional object can be identified associated with a bounding box enclosing/encompassing the multidimensional object. In this embodiment, the object of interest can include the bounding box encompassing the multidimensional object.

As referred to herein, a material generally defines how an object in a multidimensional environment is rendered. A shader is program, function, or script that determines processing related to each pixel in the scene that is rendered, using lighting input and the material configuration. This can include determining color information or depth information related to each pixel. A pixel as referred to herein can be a conventional pixel, a Texel (that is a pixel with a texture element), or any other image/frame element as known to a person of ordinary skill in the art. A texture is an image applied to a surface of any object within the multidimensional digital environment.

In various embodiments, the object of interest can be colored with unique colors. This allows calculating the number of pixels or area for a given color. Since in a multidimensional digital environment multiple objects can seem to be overlapped from the point of view of a camera, the texture gets the final representation of the scene, including objects occlusion and overlapping. Thus, if a user looks directly at the direction of an object of interest placed behind a barrier (e.g., opaque wall), the texture will not include any pixels of the object of interest.

FIG. 1 illustrates a system 100 to determine a pixel count of an object of interest in a viewport of an electronically generated multidimensional environment displayed on a graphical user interface, in accordance with one embodiment. In some embodiments, system 100 can include one or more servers 102. Server(s) 102 can be configured to communicate with one or more client computing platforms 104 according to a client/server architecture and/or other architectures. Client computing platform(s) 104 can be configured to communicate with other client computing platforms via server(s) 102 and/or according to a peer-to-peer architecture and/or other architectures. Users can access system 100 via client computing platform(s) 104.

Server(s) 102 can be configured by machine-readable instructions 106. Machine-readable instructions 106 can include one or more instruction modules. The instruction modules can include computer program modules. The instruction modules can include one or more of a first pass rendering module 108, a second pass rendering module 110, a post-processing module 112, a pixel count determination module 113 and/or other instruction modules. In one embodiment, the rendering pipeline includes at least two passes (that is the scene is rendered twice).

In this embodiment, first pass rendering module 108 can be configured to render the objects of interest in a scene to determine a depth mask of the objects of interest during a first pass. A depth mask is a texture that instead of scene colors comprises information about how far objects are placed from the camera. This information can be stored in a depth map, the depth map providing depth information related to each pixel rendered on a scene in the multidimensional digital environment. In one embodiment, during the first pass, only the objects of interests are rendered (that is, the remainder of the scene is not rendered). Thus, the resulting texture comprises depth map of the scene with only the objects of interest. Therefore, in the first pass, the scene does not have any color information. In one embodiment, distance for each pixel of the rendered scene after the first pass is stored (or encoded) in any of the Red, Green, Blue, Alpha (RGBA) components associated with each pixel. In one embodiment, the depth information is stored within the R component of RGBA color information associated with each pixel.

In one embodiment, the first pass involves using a shader that determines the depth map of the scene with only the objects of interest. The shader can, in one embodiment, determine the depth map of the scene using the z-buffer/depth buffer information of the graphics engine during the first pass rendering. As a non-limiting example, when the depth information is stored in the R component of the RGBA color information, each pixel will have an RGBA value of (depth texture, 0, 0, 0).

Second pass rendering module 110 can be configured to render the entire scene. At Second Pass the entire scene is rendered with the objects of interest rendered with another shader and material. In one embodiment, this shader can be temporary. This shader can, in one embodiment, draw each object of interest with a unique color in unlit mode. In one embodiment, the unique color associated with an object of interest can be predetermined. In one embodiment, the unique color is assigned at initialization phase, when the object of interest is loaded onto a scene. Since the second pass renders the entire image, the depth texture of each pixel of the scene is determined. In one embodiment, the depth information/texture of the rendered scene is determined, at least in part, by the z-buffer (depth buffer) maintained by the graphics engine during the rendering.

In one embodiment, a list of assigned colors (that is, colors that have been assigned to objects of interests) are maintained in memory. When an object of interest, which already been assigned a unique color, is unloaded (e.g., when a scene of the multidimensional environment is changed) the assigned color is removed from the list of assigned colors so that it can be reused by other objects of interests, when needed.

Post processing module 112 can be configured to apply a post-processing filter to determine the unique colors assigned to each object of interest. In one embodiment, the post-processing filter can be implemented using a shader program that can accept a texture as a parameter and return another texture as its output. This shader can be a separate shader or can be the same shader used to render the second pass. The filter can include the depth mask information determined from the first pass.

If the depth of pixel at the second pass depth texture equals to the depth texture determined in the first pass, the pixel is presumed to be that of an object of interest; the pixel color is left with that of the object's second pass texture color. If however, the second pass depth texture does not equal the first pass depth texture, the pixel is presumed to be pertaining to the remainder of the scene and the pixel color is replaced with a predetermined color (e.g., black) that can be used to identify the scene but for the objects of interest. Thus, the objects of interest can be determined based on their unique colors on the rendered texture.

Pixel count module 113 can be configured to count the number of pixels associated with each unique color to determine a pixel count of each object of interest. A pixel count of each color determines the pixel count of each object of interest.

In any embodiment, the ability of an Applications Programming Interface (API) associated with a graphics processor can be used to render the image to the target texture as explained above. In any embodiment, a texture with low resolution and very low graphical settings can be used for optimization purposes. In one embodiment, scene light, transparent or semi-transparent objects are not considered for optimization purposes.

In some embodiments, server(s) 102, client computing platform(s) 104, and/or external resources 114 can be operatively linked via one or more electronic communication links. For example, such electronic communication links can be established, at least in part, via a network such as the Internet and/or other networks. It will be appreciated that this is not intended to be limiting, and that the scope of this disclosure includes embodiments in which server(s) 102, client computing platform(s) 104, and/or external resources 114 can be operatively linked via some other communication media.

A given client computing platform 104 can include one or more processors configured to execute computer program modules. The computer program modules can be configured to enable an expert or user associated with the given client computing platform 104 to interface with system 100 and/or external resources 114, and/or provide other functionality attributed herein to client computing platform(s) 104. By way of non-limiting example, the given client computing platform 104 can include one or more of a desktop computer, a laptop computer, a handheld computer, a tablet computing platform, a NetBook, a Smartphone, a gaming console, and/or other computing platforms. External resources 114 can include sources of information outside of system 100, external entities participating with system 100, and/or other resources. In some embodiments, some or all of the functionality attributed herein to external resources 114 can be provided by resources included in system 100.

Server(s) 102 can include electronic storage 116, one or more processors 118, and/or other components. Server(s) 102 can include communication lines, or ports to enable the exchange of information with a network and/or other computing platforms. Illustration of server(s) 102 in FIG. 1 is not intended to be limiting. Server(s) 102 can include a plurality of hardware, software, and/or firmware components operating together to provide the functionality attributed herein to server(s) 102. For example, server(s) 102 can be implemented by a cloud of computing platforms operating together as server(s) 102.

Electronic storage 116 can comprise non-transitory storage media that electronically stores information. The electronic storage media of electronic storage 116 can include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 can include one or more virtual storage resources (e.g., cloud storage, a virtual private network, and/or other virtual storage resources). Electronic storage 116 can store software algorithms, information determined by processor(s) 118, information received from server(s) 102, information received from client computing platform(s) 104, and/or other information that enables server(s) 102 to function as described herein.

Processor(s) 118 can be configured to provide information processing capabilities in server(s) 102. As such, processor(s) 118 can include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some embodiments, processor(s) 118 can include a plurality of processing units. These processing units can be physically located within the same device, or processor(s) 118 can represent processing functionality of a plurality of devices operating in coordination. Processor(s) 118 can be configured to execute modules 108, 110, 112, 113, and/or other modules.

Processor(s) 118 can be configured to execute modules 108, 110, 112, 113, and/or other modules by software; hardware; firmware; some combination of software, hardware, and/or firmware; and/or other mechanisms for configuring processing capabilities on processor(s) 118. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated that although modules 108, 110, 112, and/or 113 are illustrated in FIG. 1 as being implemented within a single processing unit, in embodiments in which processor(s) 118 includes multiple processing units, one or more of modules 108, 110, 112, and/or 113 can be implemented remotely from the other modules. The description of the functionality provided by the different modules 108, 110, 112, and/or 113 described below is for illustrative purposes, and is not intended to be limiting, as any of modules 108, 110, 112, and/or 113, can provide more or less functionality than is described. For example, one or more of modules 108, 110, 112, and/or 113 can be eliminated, and some or all of its functionality can be provided by other ones of modules 108, 110, 112, and/or 113. As another example, processor(s) 118 can be configured to execute one or more additional modules that can perform some or all of the functionality attributed below to one of modules 108, 110, 112, and/or 113.

Figure 2:
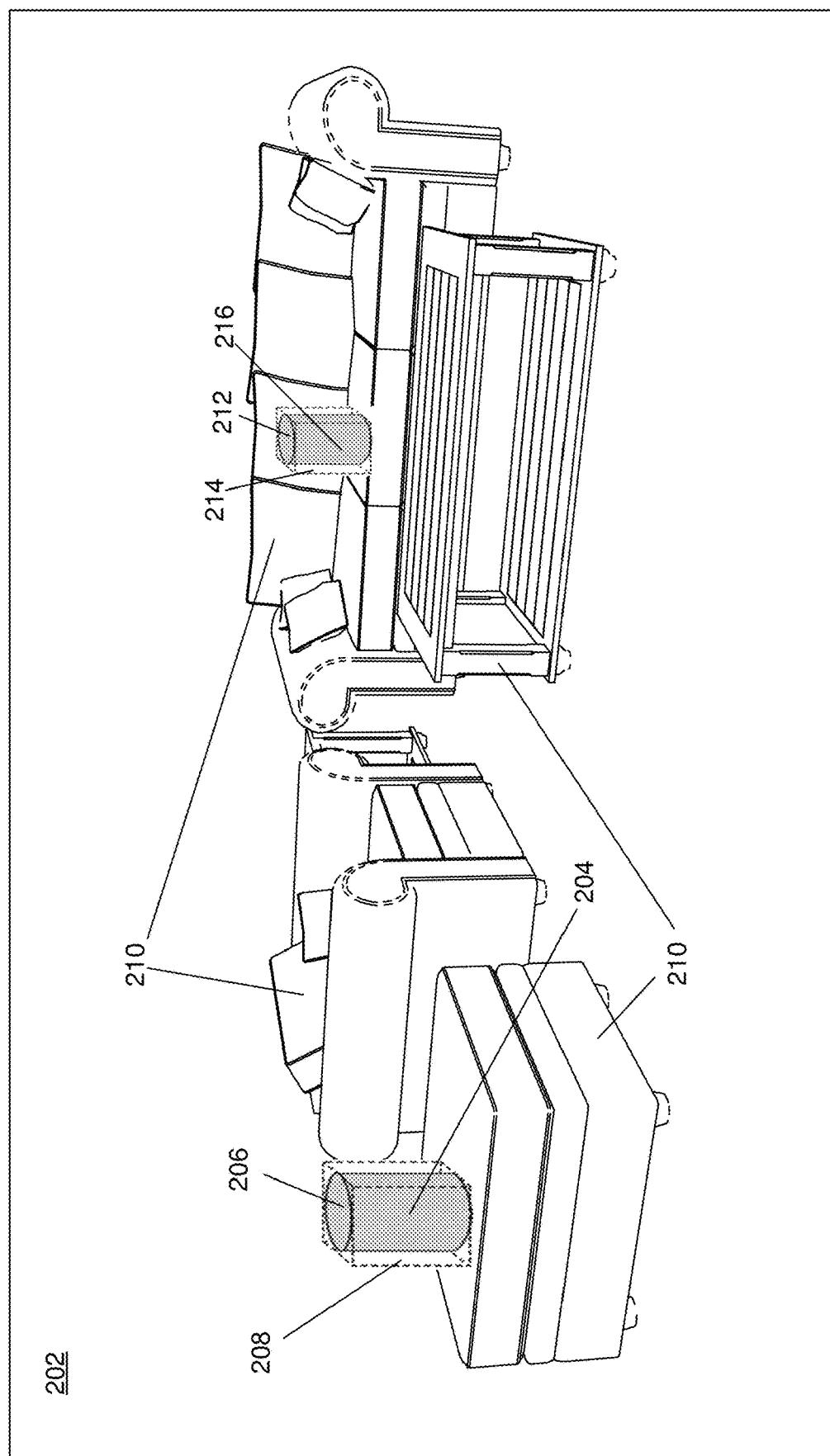
FIG. 2 illustrates scene 200 describing an exemplary multidimensional object in a multidimensional digital environment, according to one aspect of the present invention.

FIG. 2 illustrates scene 200 describing an exemplary multidimensional object in a multidimensional digital environment, according to one aspect of the present invention. As illustrated, viewport space 202, in one embodiment, includes an objects of interest 204 and 216. Objects of interest 204 and 214 each can be a multidimensional digital object/asset displayed in a multidimensional digital environment. In yet another embodiment, object of interest 204 can include multidimensional object 206 and optionally can also include bounding box 208 that encloses asset 206. Similarly, object of interest 216 can include multidimensional object 212 and optionally include bounding box 214 that encloses multidimensional object/asset 212. As illustrated scene 200 can also include other multidimensional objects 210 that are not considered as objects of interest (also referred to herein as object not of interest).

Figure 3:
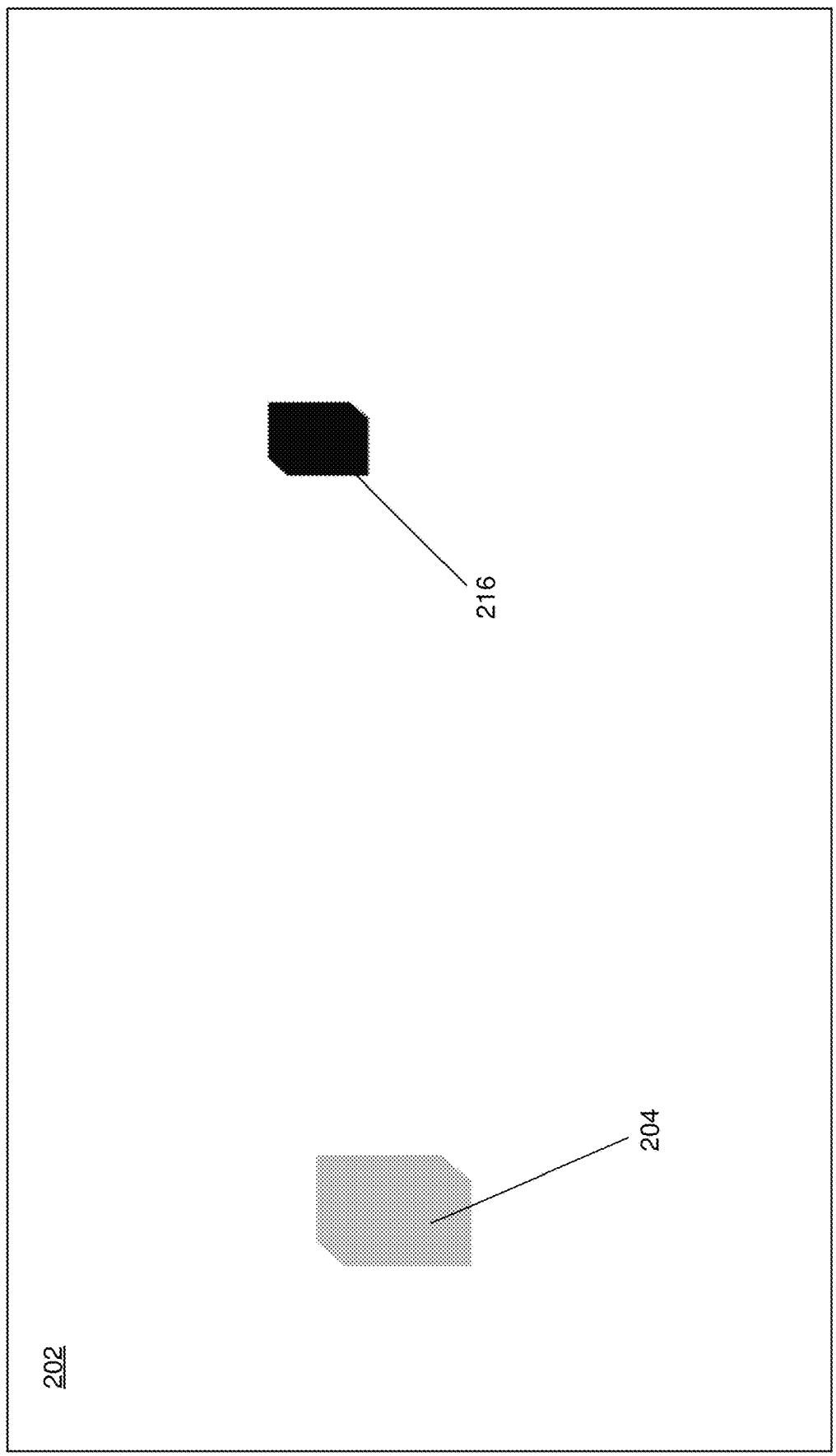
FIG. 3 illustrates rendered scene 300 which presents a colorized rendering based on texture the multidimensional object displayed in scene 200, to determine a pixel count of the multidimensional objects in the multidimensional digital environment, according to one aspect of the present invention.

FIG. 3 illustrates rendered scene 300 which presents a colorized rendering based on texture the multidimensional object displayed in scene 200, to determine a pixel count of the multidimensional objects in the multidimensional digital environment, according to one aspect of the present invention. As illustrated, scene 300 illustrates a rendered version of scene 200, according to the techniques described herein.

Once the scene 300 is rendered, objects of interest 204 and 216 in viewport 202 can be displayed without objects not of interest 210. In one embodiment, objects of interest (e.g., 204 and 216) can each be assigned a unique color from a color pool comprising set of unique colors (e.g., 65536). Each color can be encoded with 8 bits, 16 bits, 32 bits, etc. In a preferred embodiment, each color in the set of colors is encoded with 16 bits for optimization purposes. As referred to herein a unique color is indented to mean a unique shade of a color (which can usually be represented with a unique hexadecimal (hex) color code and/or red, blue, green (RGB) value).

Thus, object of interest 204 can be rendered with a specific/unique color (e.g., light gray as illustrated) to identify it from the remainder of the objects in viewport 202. Similarly, object of interest 216 can be rendered with a different unique color (e.g., black, as illustrated) so that it can be identified from the remainder of scene 300 and object of interest 204. As illustrated in viewport 202, scene 300 and all other objects not of interest 210 can be rendered in another color (e.g., white, as illustrated) that is different from the specific/unique colors used to render objects of interest 204 and 216. The rendering of object of interest 204 can be projected on viewport 202 of the multidimensional digital environment, as shown.

In one embodiment, scene 300 is rendered by an additional camera, in a lower resolution than the main camera that renders scene 200. In this embodiment, scene 300 displayed by the additional camera remains hidden from the user/viewer. In one embodiment, the additional camera can be used to implement the invention as described herein. The additional camera is overlapped with the main camera that is used to render scene 200, as viewed by the user/viewer.

FIG. 4 illustrates flowchart 400 describing the operations to determine a pixel count of a multidimensional object from the texture of the rendered object, according to one embodiment of the present invention. As illustrated, at 402, a first pass in a rendering pipeline, by a graphics processor, is performed, where the first pass renders a multidimensional object to determine a first depth information of each pixel of the multidimensional object within a scene in the multidimensional environment, and where the multidimensional object is determined to be the object of interest. At 404, a second pass in the rendering pipeline is performed, where the second pass includes rendering the scene, and wherein the multidimensional object is rendered in a first predetermined color, and wherein the second pass includes determining a second depth information of each pixel within the scene. At 406, the first depth information and second depth information for each respective pixel within the scene is compared. At 408, the color of each respective pixel in the scene is changed to a second predetermined color when its corresponding first depth information and second depth information are different. When the depth information is the same, then it is presumed the pixel is associated/belongs to an object of interest and the color of the pixel is left untouched. At 410, a total number of pixels having the first predetermined color are determined.

In a different embodiment, a pixel count can be determined with a single pass in the rendering pipeline. In this embodiment, a shader is implemented with a texture to render a scene in the multidimensional digital environment during runtime. This allows a non-intrusive and temporary shader for all objects in the scene. Such a configuration can be applied to a special camera that does not affect the main rendering pipeline and thus the user remains oblivious to the rendering performed by the special camera. The shader can, in one embodiment, render each object of interest with a unique predetermined color passed to it as an input parameter. Each surface or multidimensional setting that is not considered as the object of interest can be rendered in another predetermined color (e.g., black). In another embodiment, the shader can also be implemented to set each pixel of the scene to another predetermined color (e.g., black) when an input parameter is not passed. Any area of an object of interest that is obstructed from view of the camera is rendered with the predetermined color assigned to render each surface that is not considered as the object of interest (that is, the remainder of the scene, for example, black, as above). Since each object of interest can be identified with a unique color, therefore, the rendered scene can have the required color texture demarcating or identifying each object of interest whose pixel count needs to be determined. Any of the techniques described above while describing FIGS. 1-4 can also be implemented in other embodiments.

Figure 5:
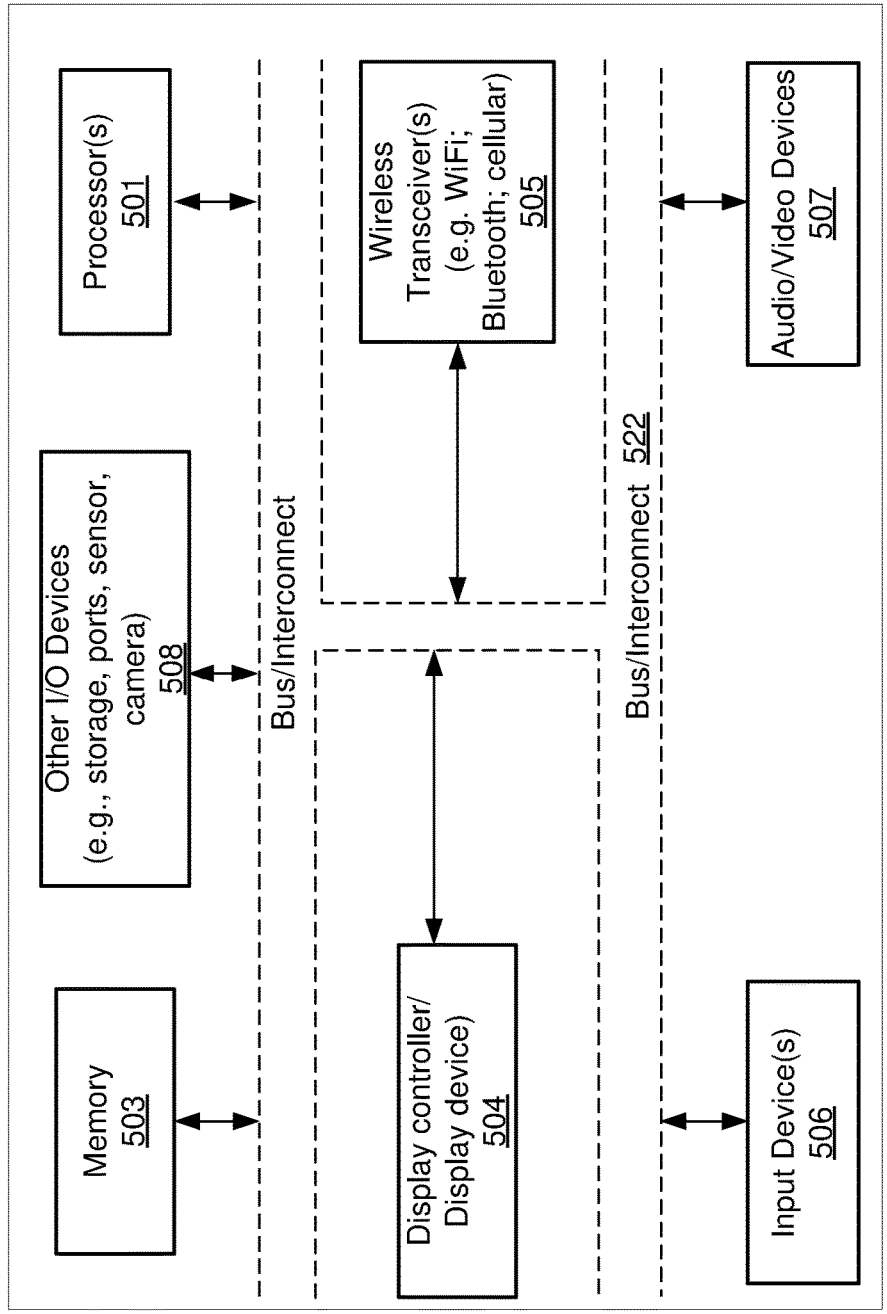
FIG. 5 is a block diagram illustrating a data processing system such as a computing system 500, in accordance with one embodiment of the invention.

FIG. 5 is a block diagram illustrating a data processing system such as a computing system 500 which may be used with one embodiment of the invention. For example, system 500 can be implemented as part of a system to determine viewability metrics of a multidimensional object in a multidimensional environment. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 500 can represent the server 52. System 500 can have a distributed architecture having a plurality of nodes coupled through a network, or all of its components may be integrated into a single unit. Computing system 500 can represent any of the data processing systems described above performing any of the processes or methods described above. In one embodiment, computer system 500 can be implemented as integrated circuits (ICs), discrete electronic devices, modules adapted to a circuit board such as a motherboard, an add-in card of the computer system, and/or as components that can be incorporated within a chassis/case of any computing device. System 500 is intended to show a high level view of many components of any data processing unit or computer system. However, it is to be understood that additional or fewer components may be present in certain embodiments and furthermore, different arrangement of the components shown may occur in other embodiments. System 500 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 500 includes processor 501, memory 503, and devices 505-508 via a bus or an interconnect 522. Processor 501 can represent a single processor or multiple processors with a single processor core or multiple processor cores included therein. Processor 501 can represent one or more general-purpose processors such as a microprocessor, a central processing unit (CPU), Micro Controller Unit (MCU), etc. Processor 501 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 501, can also be a low power multi-core processor socket such as an ultra low voltage processor, may act as a main processing unit and central hub for communication with the various components of the system. Such processor can be implemented as a system on chip (SoC).

Processor 501 is configured to execute instructions for performing the operations and methods discussed herein. System 500 further includes a graphics interface that communicates with graphics subsystem 504, which may include a display controller and/or a display device. Processor 501 can communicate with memory 503, which in an embodiment can be implemented via multiple memory devices to provide for a given amount of system memory. In various embodiments the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 503 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 503 may store information including sequences of executable program instructions that are executed by processor 501, or any other device. System 500 can further include IO devices such as devices 505-508, including wireless transceiver(s) 505, input device(s) 506, audio IO device(s) 507, and other IO devices 508.

Wireless transceiver 505 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 506 can include a mouse, a touch pad, a touch sensitive screen (which may be integrated with display device 504), a pointer device such as a stylus, and/or a keyboard (e.g., physical keyboard or a virtual keyboard displayed as part of a touch sensitive screen). Other optional devices 508 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 508 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 522 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, in one embodiment, a mass storage (not shown) may also couple to processor 501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to determine a pixel count of a multidimensional object based on texture, in a multidimensional environment are described herein. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method, comprising:
rendering, by a processor, using a shader function, an object of interest with a first color, wherein the shader function determines processing related to each pixel in a scene displayed on a viewport that is rendered using lighting input and material configuration;
rendering, using the shader function, the remainder of the scene displayed on the viewport with a second color;
determining a count of pixels rendered with the first color to determine a percentage of the object of interest displayed on the viewport;
wherein the method determines the percentage of the object of interest in a single pass of a rendering pipeline.

2. The method of claim 1, wherein the first color is provided as an input parameter of the shader function prior to rendering the scene.

3. The method of claim 1, wherein the pixel count is determined in a single pass in the rendering pipeline.

4. The method of claim 1, wherein the shader function is implemented with a texture to render the scene during runtime.

5. The method of claim 1, wherein the shader function is a temporary shader function for the entire scene.

6. The method of claim 5, wherein the temporary shader function is applied to a special camera that does not affect the main rendering pipeline, and wherein the user remains oblivious to the rendering performed by the special camera.

7. The method of claim 1, wherein the shader function renders each object of interest with a unique predetermined color passed to it as an input parameter.

8. A non-transitory computer readable medium comprising instructions which when executed by a processing system perform a method, comprising:
rendering, using a shader function, an object of interest with a first color, wherein the shader function determines processing related to each pixel in a scene displayed on a viewport that is rendered using lighting input and material configuration;
rendering, using the shader function, the remainder of the scene displayed on the viewport with a second color;
determining a count of pixels rendered with the first color to determine a percentage of the object of interest displayed on the viewport;
wherein the processing system determines the percentage of the object of interest in a single pass of a rendering pipeline.

9. The non-transitory computer readable medium of claim 8, wherein the first color is provided as an input parameter of the shader function prior to rendering the scene.

10. The non-transitory computer readable medium of claim 8, wherein the pixel count is determined in a single pass in the rendering pipeline.

11. The non-transitory computer readable medium of claim 8, wherein the shader function is implemented with a texture to render the scene during runtime.

12. The non-transitory computer readable medium of claim 8, wherein the shader function is a temporary shader function for the entire scene.

13. The non-transitory computer readable medium of claim 12, wherein the temporary shader function is applied to a special camera that does not affect the main rendering pipeline, and wherein the user remains oblivious to the rendering performed by the special camera.

14. The non-transitory computer readable medium of claim 8, wherein the shader function renders each object of interest with a unique predetermined color passed to it as an input parameter.

15. A system comprising:
a memory device; and
a processing unit coupled to the memory device, wherein the processing unit is configured to:
render, using a shader function, an object of interest with a first color, wherein the shader function determines processing related to each pixel in a scene displayed on a viewport that is rendered using lighting input and material configuration;
render, using the shader function, the remainder of the scene displayed on the viewport with a second color;

determine a count of pixels rendered with the first color to determine a percentage of the object of interest displayed on the viewport,
wherein the system determines the percentage of the object of interest in a single pass of a rendering pipeline.

16. The system of claim 15, wherein the first color is provided as an input parameter of the shader function prior to rendering the scene.

17. The system of claim 15, wherein the pixel count is determined in a single pass in the rendering pipeline.

18. The system of claim 15, wherein the shader function is implemented with a texture to render the scene during runtime, and the shader function renders each object of interest with a unique predetermined color passed to it as an input parameter.

19. The system of claim 15, wherein the shader function is a temporary shader function for the entire scene.

20. The system of claim 19, wherein the temporary shader function is applied to a special camera that does not affect the main rendering pipeline, and wherein the user remains oblivious to the rendering performed by the special camera.

* * * * *